Jan. 27, 1942.  B. B. HARDING  2,271,371
IRON WITH ILLUMINATING DEVICE
Filed June 14, 1938  2 Sheets-Sheet 2
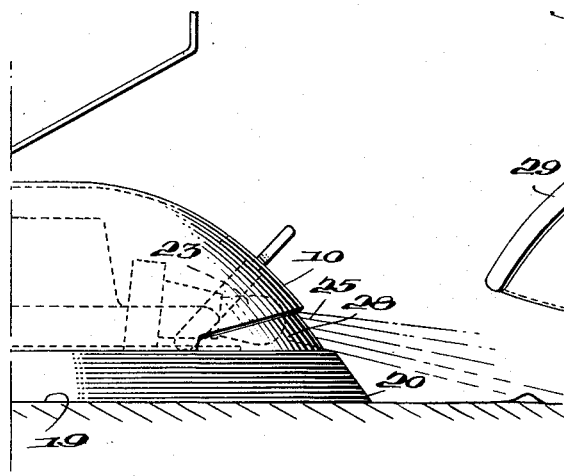
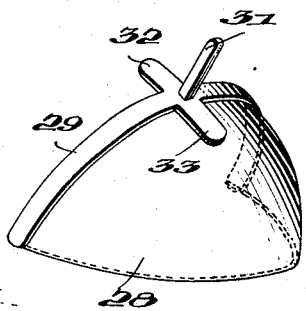
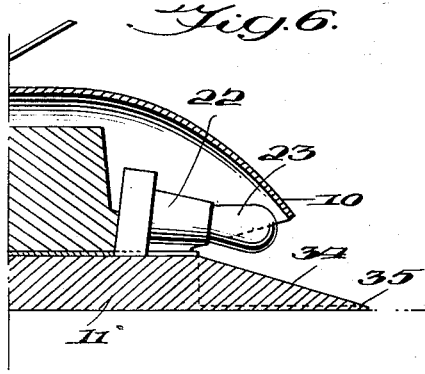
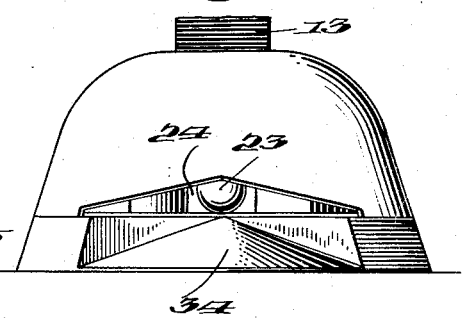
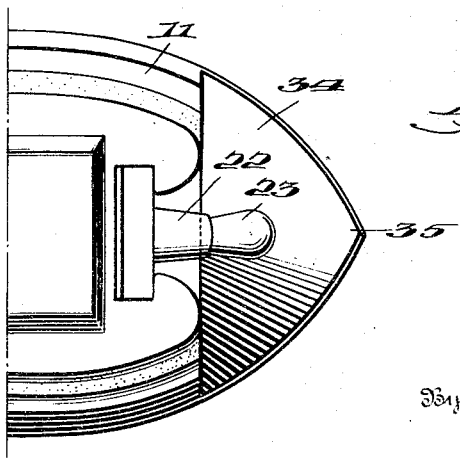
Inventor
Brooks B. Harding,
By Edmund H. Parry Jr.
Attorney Patented Jan. 27, 1942

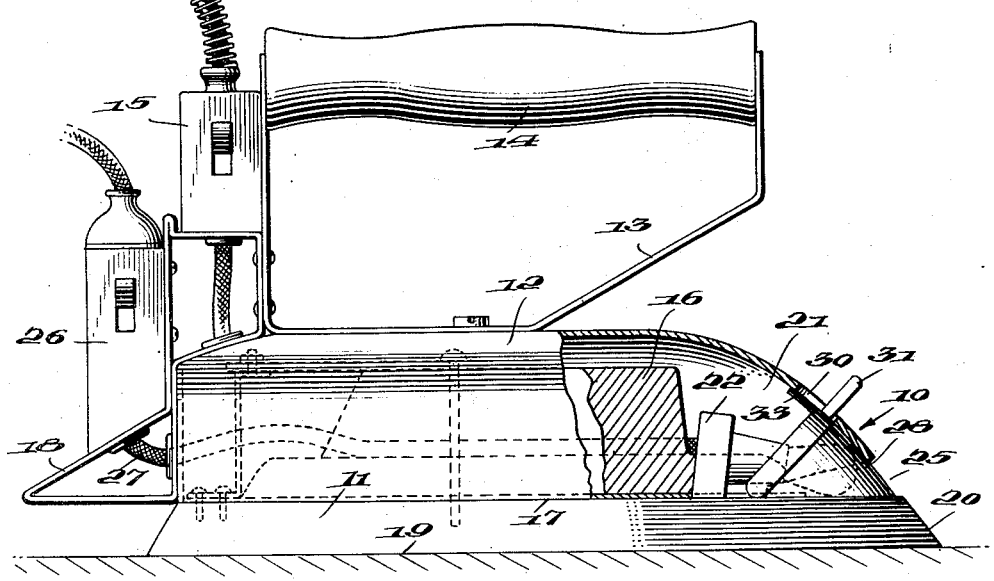
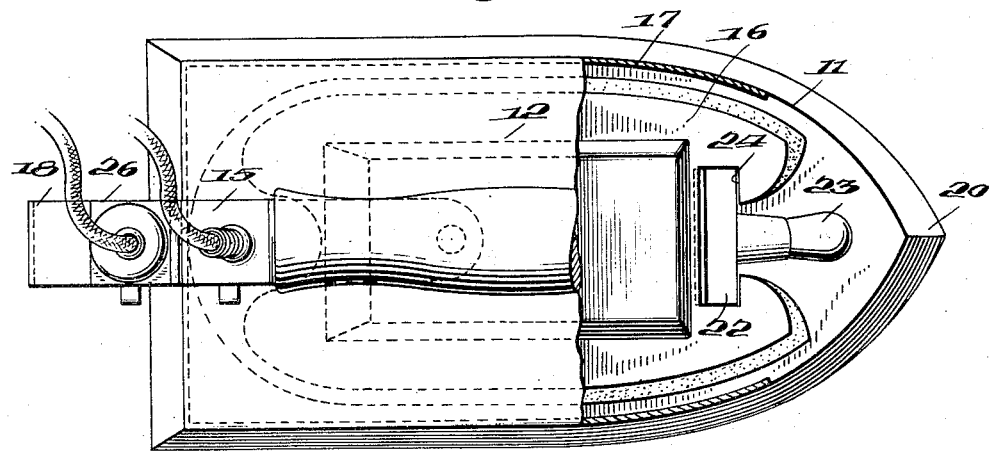
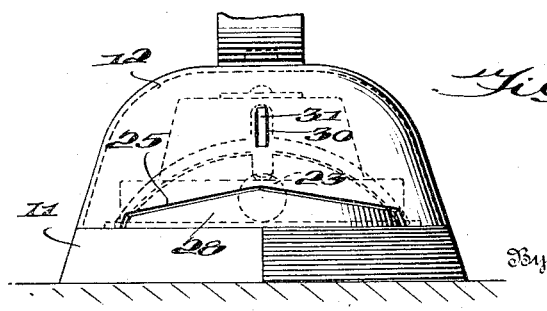

2,271,371

UNITED STATES PATENT OFFICE 2,271,371

IRON WITH ILLUMINATING DEVICE

Brooks B. Harding, Freeport, N. Y.

Application June 14, 1938, Serial No. 213,663

8 Claims. (Cl. 240—2)

This invention relates to sad irons and has particular reference to an arrangement for illuminating the work to be pressed in a zone adjacent the nose end of the iron.

It has heretofore been proposed to attach electric lamps to irons for the purpose of casting a relatively intense beam of light on the work being pressed. In many instances such devices are objectionable in that they are designed to be attached to the handle or some other portion of the iron where they either interfere with the hand of the operator, and/or partially obstruct the vision of the operator. Furthermore, various prior devices known to me have the further disadvantage that they produce an objectionable glare on the work which is tiring to the eyes of the operator, and which instead of showing up wrinkles so direct illumination on the work as to cause such wrinkles to escape notice.

It is one of the main objects of the present invention to provide a suitable illuminating arrangement for irons which will avoid difficulties such as those mentioned.

It is a further object of the invention to provide a lighting arrangement for irons which will serve to efficiently illuminate the work in an erea adjacent the nose of the iron, and whose efficiency results from its location on the iron body and the direction of the beam cast. The proposed arrangement is such that an intense beam of light is not required, and as a matter of fact it is a further feature of the invention to provide means for cutting down the intensity of illumination since my experiments have shown that efficient results can be obtained with light of relatively low intensity. The lower the light intensity consistent with efficient results the less will be the glare which tends to tire the eyes of the operator. The means referred to for cutting down the intensity of illumination is particularly intended to be used when white material is being ironed, since the glare therefrom is particularly bad. According to the invention the arrangement is such that when ironing colored materials the intensity of illumination may be intentionally increased, since colored materials partially absorb the light and do not produce nearly as great a glare.

It is a further specific feature of the invention to provide a lighting arrangement for irons which will be located relatively near the bottom of the iron so as to cast a light beam in a direction as nearly parallel as possible to the surface of the material being pressed. It is a still further object of the invention to so arrange an illuminating means in connection with an iron that such means will in no way interfere with the hand or line of vision of the operator.

The above and other objects and advantages of the invention will be readily understood from the several illustrative embodiments illustrated in the accompanying drawings.

In such drawings:

Fig. 1 is a longitudinal elevation of an iron embodying the present invention, certain parts being broken away to show points of interior construction;

Fig. 2 is a top view of the construction shown in Fig. 1, and wherein the arrangement of the illuminating means is clearly shown;

Fig. 3 is a front end view of the same iron showing the arrangement of the nose, and indicating certain of the interior parts in broken lines;

Fig. 4 is a fragmentary side view of the nose of the iron taken at right angles to Fig. 3;

Fig. 5 is a perspective view of one element of the invention;

Fig. 6 is a longitudinal section of the nose end of an iron involving a modification of the embodiment illustrated in Figs. 1–4;

Fig. 7 is a front end view showing the nose of the iron of the embodiment of Fig. 6; and, Fig. 8 is a fragmentary plan view of the nose of the iron with the top casing removed.

In the embodiments of Figs 1-4 the iron body has a pointed nose generally designated 10 at its forward end. In general the iron body illustrated is of one conventional design and comprises a base member 11, in which may be embedded or on which may be disposed an electrical resistance heating unit (not shown), a top shell or casing 12, and a handle arrangement comprising a metal frame 13 secured to the top of the shell and supporting a handle 14. An electric switch plug 15 in the form of iron illustrated is detachably supported on a bracket at the rear of the handle and serves to control the flow of current through an electric cable from a wall plug to the electic heating unit.

The top shell is hollow, and interiorally thereof may be located a weight plate 16 which may be anchored by suitable means to the top surface 17 of the base member 11. A rest 18 in the form of a metal bracket may be mounted at the rear end of the casing 12.

According to the invention the lamp socket will be mounted at the nose end 10 of the iron in relatively close proximity to the undersurface 19 of the base member, and slightly rearwardly of the front end extremity 20 thereof. To this end the nose portion is provided with an interior chamber 21 formed by the nose portion of the top shell 12. Where as illustrated a weight plate 16 is used, the same will be cut away adjacent the nose portion as best illustrated in Fig. 2. Interiorly of the nose of the iron body, that is in the chamber 21 formed by the top shell, is disposed an electric lamp socket 22 in which will be inserted a relatively small sized electric lamp 23. The socket 22 is mounted on the upper side 17 of the base member 11 and the same may be secured in a vertically recessed portion 24 in the front portion of the weight plate 16. Obviously, however, the lamp member may be secured in a similar position through some other fastening arrangement. The front end of the top shell 12 adjacent its point of meeting with the upper surface 17 of the base member 11 is cut away as shown in Figs. 1, 3 and 4 to provide an opening 25. Such opening will preferably extend rearwardly to a line passing through or slightly back of the lamp 23 as will be understood from Figs. 1 and 4. Such opening need not be and preferably is not very deep vertically. In the form shown it will be noted that it is not quite as high as the upper side of the lamp bulb.

It is optional whether the lamp bulb be connected in parallel with the heating unit and controlled by the light switch 15, or whether the same be provided with a separate control switch. In the present instance a separate switch plug 26 is provided, the same being supported on the rest 18 and connected to a cable 27 to the lamp socket through suitable terminals which, for purposes of clarity, have been omitted from the drawing. If desired the cable above the switch plug 26 may be spliced to the cable above the switch plug 15 so that a single wall socket may be used.

It will be observed that the arrangement is such that the illuminating means is housed entirely within the body of the iron with the result that it is not in the way, and being housed within the top shell 12 no special shade is required as is usually the case with prior devices. Because of the fact that the lamp 23 is located in close proximity to the ironing surface 19 of the base member, the beam of light cast thereby as diagrammatically represented in Fig. 4 will be in a generally forward direction more or less parallel with the material to be pressed. This will minimize glare from the surface of the material and thus cut down eye strain. The arrangement is radically different from prior constructions wherein the light is not only mounted exteriorly of the iron but positioned relatively high above the base of the iron so that, to illuminate an area around the nose of the iron, it is necessary that the light be directed downwardly, or at least at a substantial angle to the surface of the material.

A further important benefit of the arrangement whereby the light beam is directed primarily in a forward direction as distinguished from a vertical direction is that any wrinkles in the work are caused to cast a definite shadow. I have definitely proved by my experiments that wrinkles or other unevennesses in the surface of the material being pressed will cast shadows and be readily apparent to the operator, whereas the light is mounted substantially above the surface of the material and directed downwardly thereon such defects may entirely escape notice.

Since, for the reasons just explained, the light operates effectively primarily by reason of the direction of the light beam, the intensity of illumination is of secondary importance, and I have found that in some cases, particularly where white material is being ironed the normal intensity of illumination of the lamp 23 can be diminished with a view of minimizing undesired glare. To this end I provide a shield 28, preferably of somewhat flexible material, which fits in the opening 25 at the nose of the top shell. Such shield is preferably made of mica, or some other heat-resistant material. Mica is also desirable in that it is not entirely transparent. Being translucent it permits the passage of light from the lamp 23, but cuts down the intensity thereof.

As shown in Fig. 5 the mica shield 28 may be provided at its rear with a supporting frame 29 which clips along the rear edge thereof, and which holds the shield in a shape generally conforming to the contour of the nose end of the top shell 12. As best shown in Fig. 1 a longitudinal slot 30 may be provided in the top shell 12 adapted to receive a handle or button 31 secured to member 29. Through such arrangement the shield 28 may be raised so that a direct beam of light will be projected unimpaired through the nose opening 25. Again, the shield may be lowered to the position shown in the various figures so that the light beam from the lamp passes therethrough. To prevent light from escaping through slot 30, the shield frame 29 may be provided with a pair of longitudinal wings 32 and 33 which respectively will close the slot 30 when the shield is in its lowered and raised positions.

I have found it unnecessary to provide a special fastening means for the shield 28. The same can conveniently be caused to ride upwardly and downwardly against the inner wall of the shell and/or against the rounded bulb surface of the lamp 23. In the arrangement here shown the surface of the bulb is located relatively close to the wall of the shell and these two parts coact to frictionally engage the shield and hold the same in any adjusted position.

It will be understood that the means for varying the intensity of illumination which here comprises the shell 28 may be omitted without sacrificing the primary benefits of the invention.

In the embodiment just described it has been pointed out that the lamp is located rearwardly of the front extremity 20 of the base member 11. While the base member in the iron shown is relatively thin, and is beveled at its edges, as will be apparent from Figs. 2 and 3, the thickness thereof taken in connection with the position of the light is such that some shadow will be cast in a narrow zone immediately adjacent the edges of the base member. I have found from experience that this is not objectionable since the operator will concentrate her vision on the material at a point removed from and forwardly of the nose of the iron. As a matter of fact it may be quite desirable to avoid intense illumination immediately around the point. I have, therefore, intentionally arranged the lamp so that an obstruction, in the present case the forward portion of the base member itself, will interrupt part of the light beam from the lamp which would otherwise impinge on the surface of the material being ironed immediately in front of the extremity of the base. A shadow will be cast by the obstruction depending in part on the position of the lamp, say for over an area along the side edges and adjacent the point from one-half to one inch in width. It will be understood that I do not limit myself to the arrangement by which the base portion of the iron acts as an obstruction to the light beam in the point area, since obviously other means may be employed to interrupt a portion of the light beam and produce a shadow around the point.

The shadow can be eliminated if desired without bringing the lamp so forwardly as to require a construction which would interfere with the line of vision by modifying the nose portion of the iron in such manner that the beam of light will impinge on the material in the area immediately adjacent the point and side edges of the iron base. One such modified arrangement is illustrated in Figs. 6 through 8. In such construction the position and arrangement of socket 22 and lamp 23 is the same as before. The iron base member 11, however, has a modified nose portion, the same being cut away on a longitudinal medial line from a point slightly back of lamp 23 to provide a forwardly and downwardly inclining surface 34. The surface 34 will incline towards the sides as well as towards the front extremity 35 as will be understood from Figs. 7 and 8 so that the beam of light cast by the lamp will impinge on the material being ironed in the immediate area of the edges of the base around the nose portion. The base may be cut away in some other suitable manner, but of course care should be taken not to reduce the mass of the material to the point where it will not hold sufficient heat. Since the nose portion of the iron is the most important area thereof in any pressing operation it should not be allowed to be cooler than other areas.

It will be understood that the invention is capable of some range of modification and equivalency without departing from the essential features thereof which distinguish the same from prior iron light arrangements. The embodiments shown are therefore to be taken as merely illustrative and the scope of the invention determined from the appended claims.

I claim:

1. An electric iron comprising a main body portion formed with a pointed nose at its forward end, a chamber within the iron body portion, a lamp in said chamber, and an opening through the front end of the nose in the lower portion thereof through which rays of the lamp are projected said opening being positioned to project a beam from said lamp forwardly of the iron body in a substantially horizontal direction along the material being pressed.

2. An iron comprising a main body portion having a nose at its forward end, and an electric lamp housed within the nose of the body portion in proximity to the bottom of the iron, and a horizontally slotted opening in the nose providing for projection of illumination from the lamp said opening being positioned to project a beam from said lamp in a substantially horizontal direction along the material being pressed.

3. An iron comprising a base member and a top shell secured on the upper side of the base member, an opening through the front end of the shell in the lower portion thereof near the bottom ironing surface of the base member, and an electric lamp socket housed within the top shell behind said front opening adapted to support an electric lamp in generally horizontal alignment with said opening for substantially horizontal illumination of the material to be pressed.

4. An iron comprising a base member and a hollow top shell fitted on the top of the base member and meeting the base member along a line relatively near the bottom ironing surface of the base member, a lamp socket housed within the top shell, and a light projecting opening in the forward end of the iron located adjacent the meeting line of the base member and top shell said opening being positioned to project a beam from a lamp received in said socket forwardly of the iron in a substantially horizontal direction along the material being pressed.

5. An iron comprising a main body portion formed with a nose at its forward end, a chamber in said nose, an electric lamp in said chamber, a light projecting opening in the forward end of the nose relatively close to the bottom ironing surface said opening being positioned to project a beam from said lamp forwardly of the iron body in a substantially horizontal direction along the material being pressed, and means for varying the intensity of light from the lamp projected through said opening.

6. An iron comprising a base member terminating in a pointed forward end, and a top shell secured to the base member, a lamp mounted in the nose of the iron within the top shell, said forward end portion of the base member having a downwardly inclining surface in spaced relation to the top shell providing an aperture for projection of illumination from the lamp in an area immediately adjacent the edges of the base member.

7. An electric iron comprising a main body portion formed with a pointed nose at its forward end, a chamber within the iron body portion, a lamp in said chamber, and an opening through the front end of the nose relatively close to the bottom ironing surface through which rays of the lamp are projected, said opening being positioned to project a beam from said lamp forwardly of the iron in a substantially horizontal direction along the material being pressed.

8. An iron comprising a body having a forward nose portion ending in a pointed tip and having a bottom ironing surface, a lamp carried by the iron at substantially the longitudinal center line of the iron rearwardly of the tip so as not to interfere with observation of the material to be pressed adjacent the tip, said lamp being mounted in close proximity to the bottom ironing surface below the top level of the body to throw a light beam forwardly in a substantially horizontal direction along and adjacent the material to be pressed.

BROOKS B. HARDING.